(No Model.) 2 Sheets—Sheet 1.

F. F. BISCHOFF.
EGG TRAY.

No. 518,341. Patented Apr. 17, 1894.

Witnesses.
C. H. Keeney
Oma V. Faust

Inventor
Ferdinand F. Bischoff
By Benedict & Morsell
Attorneys.

(No Model.) 2 Sheets—Sheet 2.
F. F. BISCHOFF.
EGG TRAY.
No. 518,341. Patented Apr. 17, 1894.
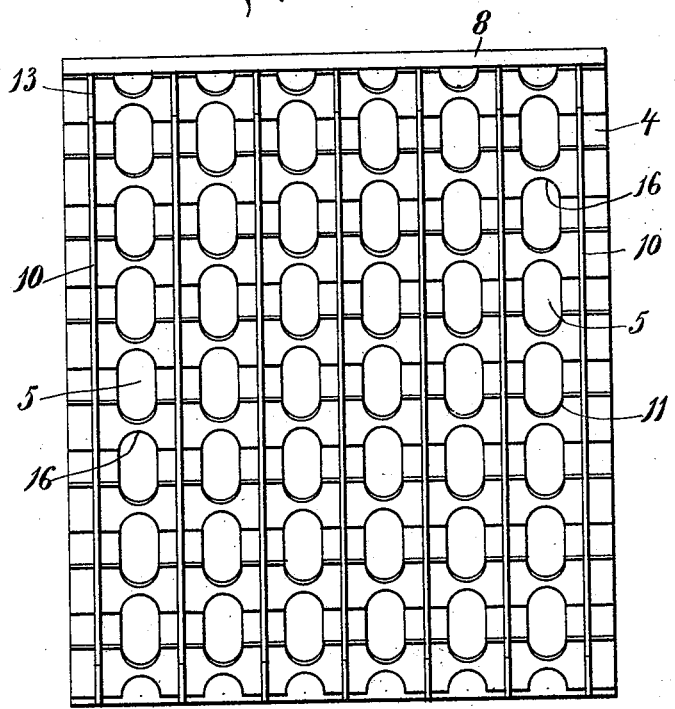
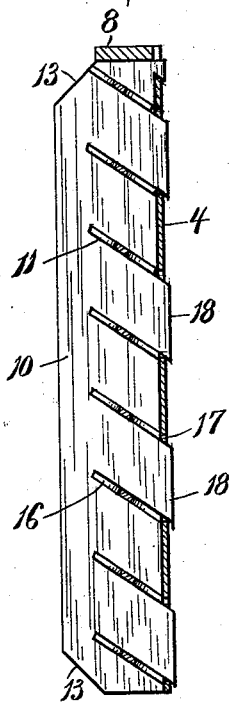
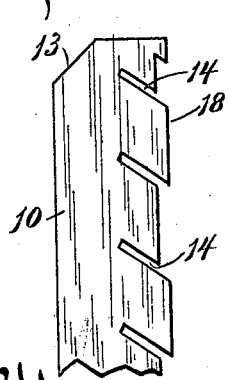
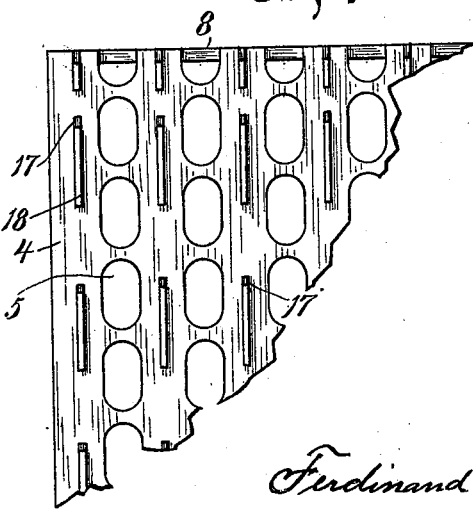
Witnesses.
C. N. Keeney.
Anna V. Faust.
Inventor.
Ferdinand F. Bischoff.
By Benedict & Morsell
Attorneys.

UNITED STATES PATENT OFFICE.

FERDINAND F. BISCHOFF, OF MILWAUKEE, WISCONSIN.

EGG-TRAY.

SPECIFICATION forming part of Letters Patent No. 518,341, dated April 17, 1894.

Application filed November 17, 1893. Serial No. 491,191. (No model.)

*To all whom it may concern:*

Be it known that I, FERDINAND F. BISCHOFF, of Milwaukee, in the county of Milwaukee and State of Wisconsin, have invented a new and useful Improvement in Egg-Trays, of which the following is a description, reference being had to the accompanying drawings, which are a part of this specification.

My invention has relation to improvements in egg trays.

The objects of the device are to provide a construction wherein the trays are capable of being readily placed in and removed from the containing case vertically; to provide a construction wherein the fillers when unfit for further use, are capable of being removed, whereby a tray can be utilized for a long period of time, with only the necessity of the occasional substitution of new fillers for worn or damaged ones; and, furthermore, to provide a convenient means for supporting the eggs in an inclined position, with clear or unobstructed openings at the points of support, whereby almost the entire egg is visible from either side of the tray, so that when the tray is removed from the casing, the eggs can be tested without the necessity of removing the same from said tray.

With the above, and other incidental, objects in view, the invention consists of the devices and parts as hereinafter described and claimed, or their equivalents.

Figure 5:
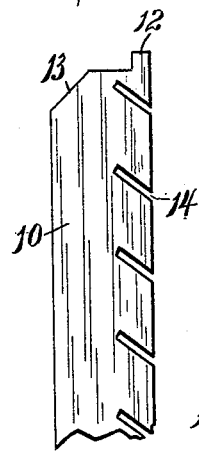
Figure 1:
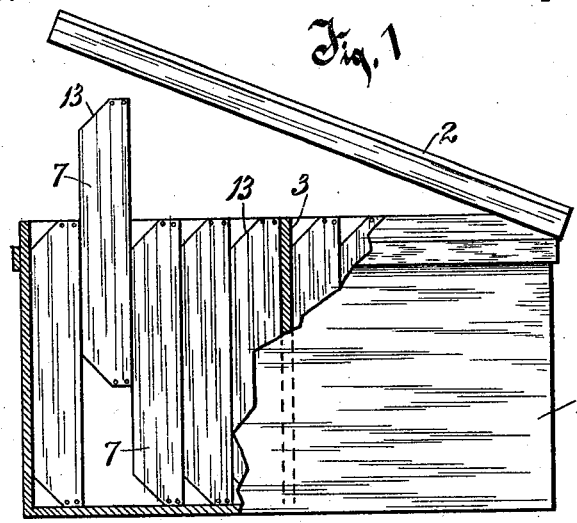
Figure 6:
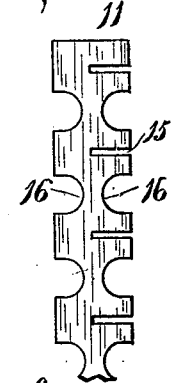
Figure 2:
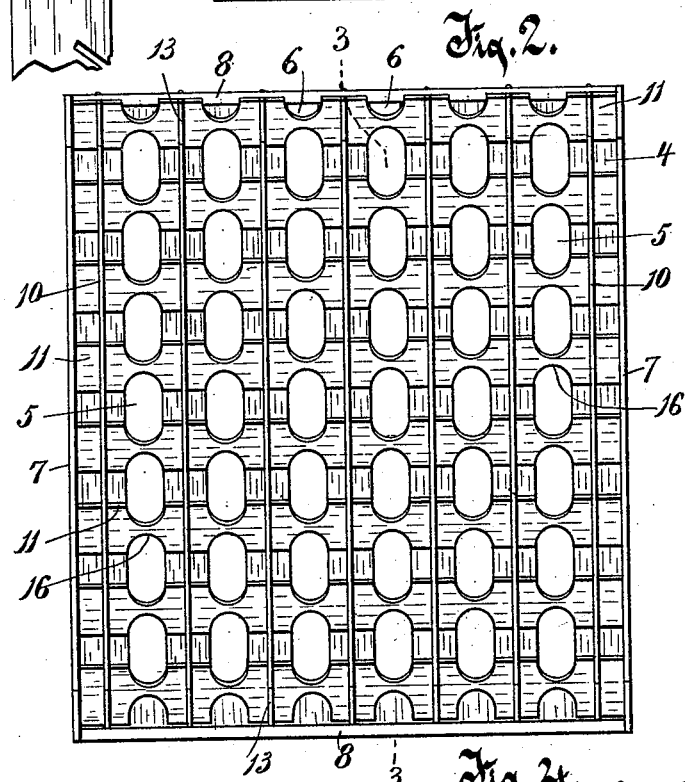
Figure 3:
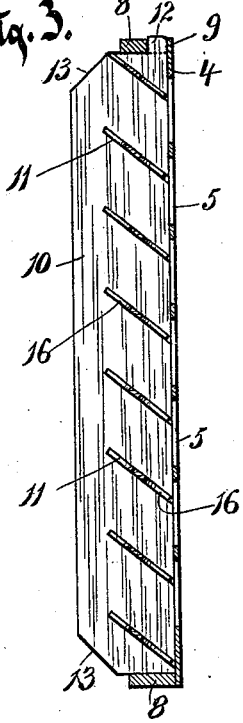
Figure 4:
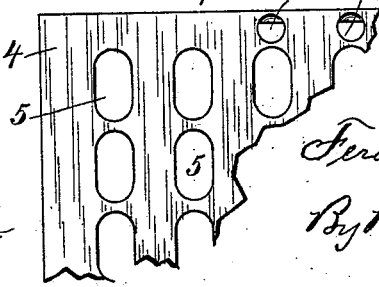

In the accompanying drawings, Figure 1, is a side elevation of a casing, with a portion broken away, to show the arrangement of my improved trays therein, one of said trays being partially withdrawn. Fig. 2, is a front elevation of a tray. Fig. 3, is a transverse, vertical section on the line 3—3 of Fig. 2.
Fig. 4, is a view of a fragment of the back piece of a tray. Fig. 5, is a fragmentary detail of one of the longitudinal strips of the filler. Fig. 6, is a fragmentary detail of one the transverse inclined strips. Fig. 7, is a front elevation of a modified form of tray. Fig. 8, is a transverse vertical section of Fig. 7. Fig. 9, is a rear elevation of a fragment of Fig. 7, and Fig. 10, is a fragmentary detail of one of the longitudinal partitions shown in Fig. 7.

Like numerals of reference denote like parts throughout the several views.

Referring to the drawings, the numeral 1 indicates an outer casing, provided with a cover 2, and, preferably, with a partition 3, the latter forming the casing into two compartments, each capable of accommodating five trays.

In the principal form of device illustrated on Sheet 1, of the drawings, the tray consists of a back piece 4, of pasteboard, or similar material, provided with a series of elliptical openings 5, and medially at its top with circular openings 6, 6, for the accommodation of the fingers in withdrawing the tray. Side pieces 7, 7, are also provided for the back piece, formed, preferably, as an integral part thereof, by bending the edges of the back piece forward. These sides are connected at the top and bottom of the tray by means of transverse border strips 8, 8, of less width than the sides, which are placed edgewise on the back piece, and are nailed, or otherwise suitably secured thereto. The top border strip 8 is provided at its rear edge with a series of slits
9. The filler is made up of a series of longitudinal partitions 10, and a series of transverse inclined strips 11, said longitudinal partitions provided at their upper ends with projecting tongues or tangs 12, which fit in the slits 9. The opposite ends of the front edge of each partition 10, and side piece 7, are beveled as indicated at 13, 13. By providing these bevels no square corners are presented to obstruct the ready insertion of a tray within the receptacle or casing, as the beveled lower end of a tray while in the act of being inserted will ride past the square corner of the tray next in front, while the beveled upper edge of the tray back of the one being inserted, will permit the square corner of the back of said last named tray to ride past without serious impediment. Each longitudinal partition is provided with a series of slits 14, inclined forward for a desired distance from its rear edge, while each transverse strip 11 is provided, at equi-distances apart along its forward edge, with a series of slits 15, which are passed into and beyond slits 14 so as to embrace opposite sides of the longitudinal partitions, and thereby held in place, the transverse strips being forced forward far enough to bring their rear edges flush, or practically so, with the rear edges of the longitudinal partitions, to permit of the filler resting squarely against the back of the tray. It will be observed that, when the transverse strips are thus disposed, they form the forward-inclined tops and bottoms of a series of pockets or receptacles for the eggs, the ends of the eggs, when in place therein, resting against the back piece of the tray. Each transverse strip is provided, at opposite edges, between the longitudinal strips, with half oval or elliptical recesses 16, 16. As the inclined transverse strips 11 are arranged with reference to the longitudinal partitions so that the front edge of each transverse strip will be in exact line with the next strip of the series, a complete oval or elliptical opening is formed, which registers exactly with the corresponding opening in the back piece 4.

From the above description it is thought that the form of construction illustrated on Sheet 1 of the drawings, will be readily understood. The pockets formed by the peculiar arrangement of the longitudinal partitions and transverse strips are filled with eggs, the ends of said eggs resting against the webs of the back piece separating the openings of said back piece. When the trays are arranged within the casing or receptacle, as illustrated in Fig. 1, they can be readily removed therefrom vertically, and as readily replaced in position. In using egg trays which are adapted to be removed horizontally from the casing, considerable floor space has necessarily to be left in front of the casing in order to permit of the withdrawal of the tray. It is of course obvious that economy of space, whether the casings are arranged in a store or are *in transitu* is a desideratum. With my improved construction, wherein the trays are removable vertically, this additional floor space is not required, and consequently the invention in this respect, subserves a desirable end.

Again, in the ordinary manner of constructing egg trays, and arranging them in the casing, it is necessary in order to test the eggs that they be separately removed from the tray, inasmuch as but a small portion of the eggs is visible when arranged in the pockets of the tray. By supporting the eggs in the manner shown in my invention, however, and providing the semi-oval recesses in the transverse strips, registering with the correspondingly shaped openings in the back piece 4, all that is necessary is simply to remove a tray from the casing, after which the entire number of eggs contained in said tray can be thoroughly tested while still in place within the tray, inasmuch as almost the entire length of an egg is visible either from the front or back of the tray. The semi-elliptical recesses also have an additional function in permitting of the ready insertion of the fingers into the pockets for the removal of an egg.

A still further advantage possessed by my invention is the adaptability of the filler to removal, so that when it becomes worn or damaged, the entire tray does not become useless. This advantage is gained by reason of the fact that the filler rests loosely against the back piece of the tray and is only held in place by reason of the projecting tongues or tangs 12 fitting the slits 9 of the upper transverse border strip 8.

In the modified form of device illustrated on Sheet 2 of the drawings, the back piece 4 may or may not, as desired, have its edges bent forward to form side pieces. In the drawings these side pieces are omitted and also the lower transverse border strip 8, the upper one being provided for the purpose of strengthening and stiffening the structure. In this modified form of device, also, the longitudinal partitions are detachably secured directly to the back piece 4, and for this purpose said back piece is provided with a series of elongated openings 17. Every alternate tongue formed by the slits 14 of the longitudinal partitions is projected rearward beyond the other tongues, and said projecting tongues (indicated by the numeral 18) pass through the openings 17 of the back piece, while the shorter tongues rest against the face of said back piece. The transverse strips 11 of this construction are exactly similar to the corresponding strips of the principal form, and are also passed up into the slits 14 in a similar manner.

It will be seen from the above that while the modified construction retains all the advantageous features of the principal form, yet the construction is somewhat simplified and cheapened by the omission of parts.

Having thus described my invention, what I claim, and desire to secure by Letters Patent, is—

1. As an improved article of manufacture, an egg tray adapted to be arranged vertically in its containing receptacle, the tray provided with a series of pockets for supporting the eggs, and the bottom pieces of said pockets arranged at upward inclines, whereby the eggs are supported thereby, when the trays are disposed vertically in the receptacle, substantially as set forth.

2. In combination with an egg tray having its back piece provided with a series of elongated openings, of a filler adapted to fit within said tray, and composed of longitudinal partitions and transverse strips, said partitions provided with inclined slits forming a series of tongues every alternate one thereof being projected rearward beyond the other tongues, and passed through the elongated openings of the back piece, and the transverse strips provided with slits adapted to interlock with the slits of the longitudinal partitions, whereby said transverse strips are secured to the partitions in inclined positions, substantially as set forth.

3. As an improved article of manufacture, an egg tray having its back provided with a series of elongated openings, and said tray divided into a series of compartments or pockets, two of the opposite side walls of said pockets being inclined, the inclined walls having their edges provided with recesses, the recessed edges of the upper and lower walls, respectively, of contiguous pockets being in alignment whereby a continuous opening is formed for each pocket, said opening registering with one of the openings of the back of the tray, substantially as set forth.

4. In combination with an egg tray, of a filler adapted to fit therein, said filler composed of longitudinal partitions and transverse strips, said partitions provided with inclined slits, and the transverse strips also provided with similar slits adapted to interlock with the slits of the longitudinal partitions, whereby a series of pockets is formed, each having two parallel straight sides, and two parallel upward inclined sides, the latter forming upward inclined bottoms for each pocket, and adapted to support an egg within each pocket, when the tray is arranged vertically in its containing case, substantially as set forth.

5. The combination with an egg tray, having the back piece thereof provided with a series of elongated openings, and its end border strip provided with slits of a filler adapted to fit within the tray, said filler composed of longitudinal partitions and transverse strips, said partitions having end tongues or tangs fitting the slits of the upper border strip, and also provided with inclined slits, and the transverse strips provided with slits adapted to interlock with the slits of the longitudinal partitions, for securing the same thereto in inclined positions, said transverse strips provided with recessed edges, the recessed edges of the upper and lower strips of the contiguous pockets formed by the union of the partitions and strips being in alignment, whereby an opening is formed for each pocket, which opening registers with one of the openings of the back piece, substantially as set forth.

6. The combination, with an egg tray the back piece thereof provided with a series of elongated openings, of a filler consisting of longitudinal partitions and transverse strips, said longitudinal partitions provided with inclined slits, and the transverse strips also provided with slits interlocking with the slits of the partitions, whereby said transverse strips are secured thereto, and said transverse strips further provided with recessed edges, the recessed edges of the upper and lower strips of the contiguous pockets formed by the union of the partitions and strips being in alignment, whereby an opening is formed for each pocket registering with one of the openings of the back piece, substantially as set forth.

In testimony whereof I affix my signature in presence of two witnesses.

FERDINAND F. BISCHOFF.

Witnesses:
ARTHUR L. MORSELL,
ANNA V. FAUST.